July 11, 1950  F. G. CORNELL, JR  2,514,375
VARIABLE SPEED CHURN AND BUTTER WORKER
Filed Oct. 11, 1947   12 Sheets-Sheet 1

INVENTOR.
FRITZ G. CORNELL, JR.
BY
Kenyon & Kenyon
ATTORNEYS

July 11, 1950  F. G. CORNELL, JR  2,514,375
VARIABLE SPEED CHURN AND BUTTER WORKER
Filed Oct. 11, 1947  12 Sheets-Sheet 3

INVENTOR.
FRITZ G. CORNELL, JR.
BY
Kenyon & Kenyon
ATTORNEYS

July 11, 1950 F. G. CORNELL, JR 2,514,375
VARIABLE SPEED CHURN AND BUTTER WORKER
Filed Oct. 11, 1947 12 Sheets-Sheet 4
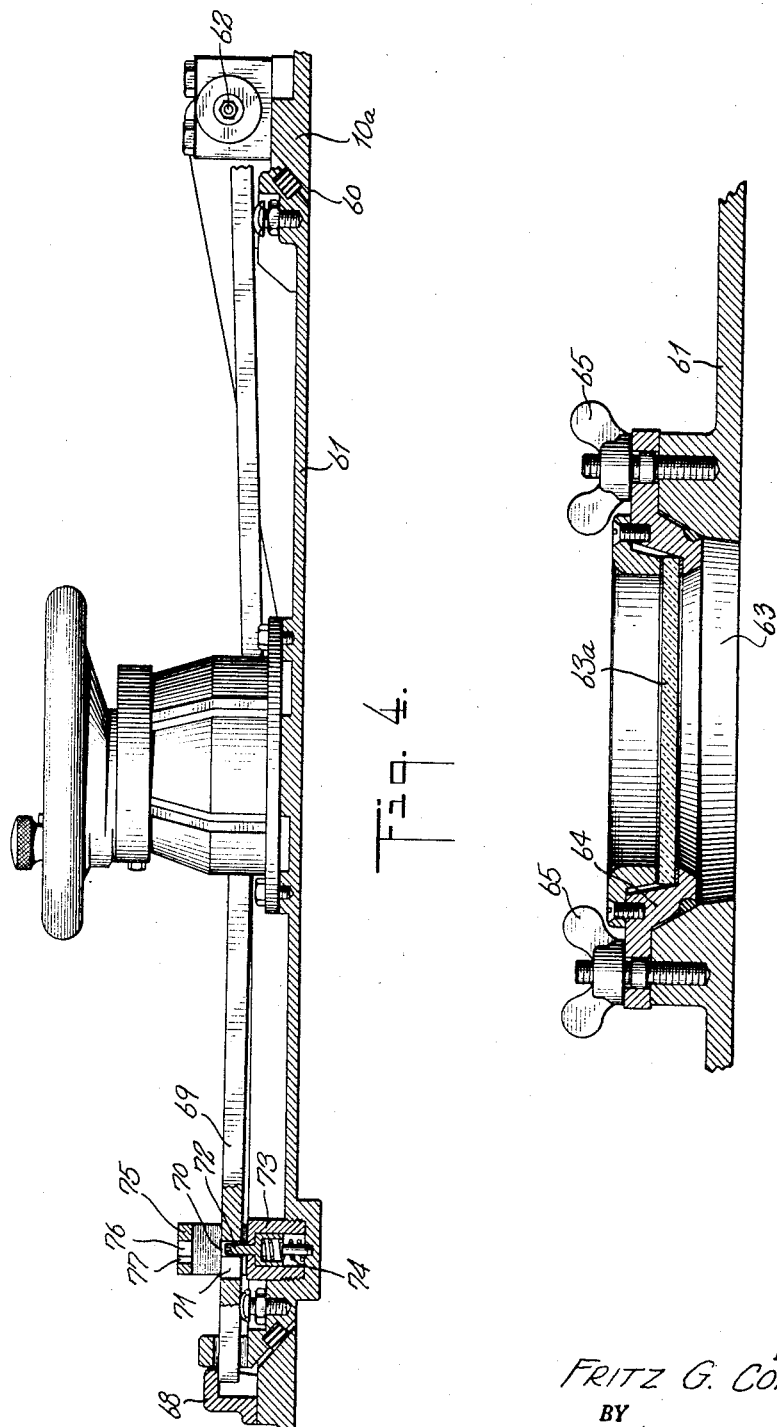
INVENTOR.
FRITZ G. CORNELL, JR.
BY
Kenyon & Kenyon
ATTORNEYS

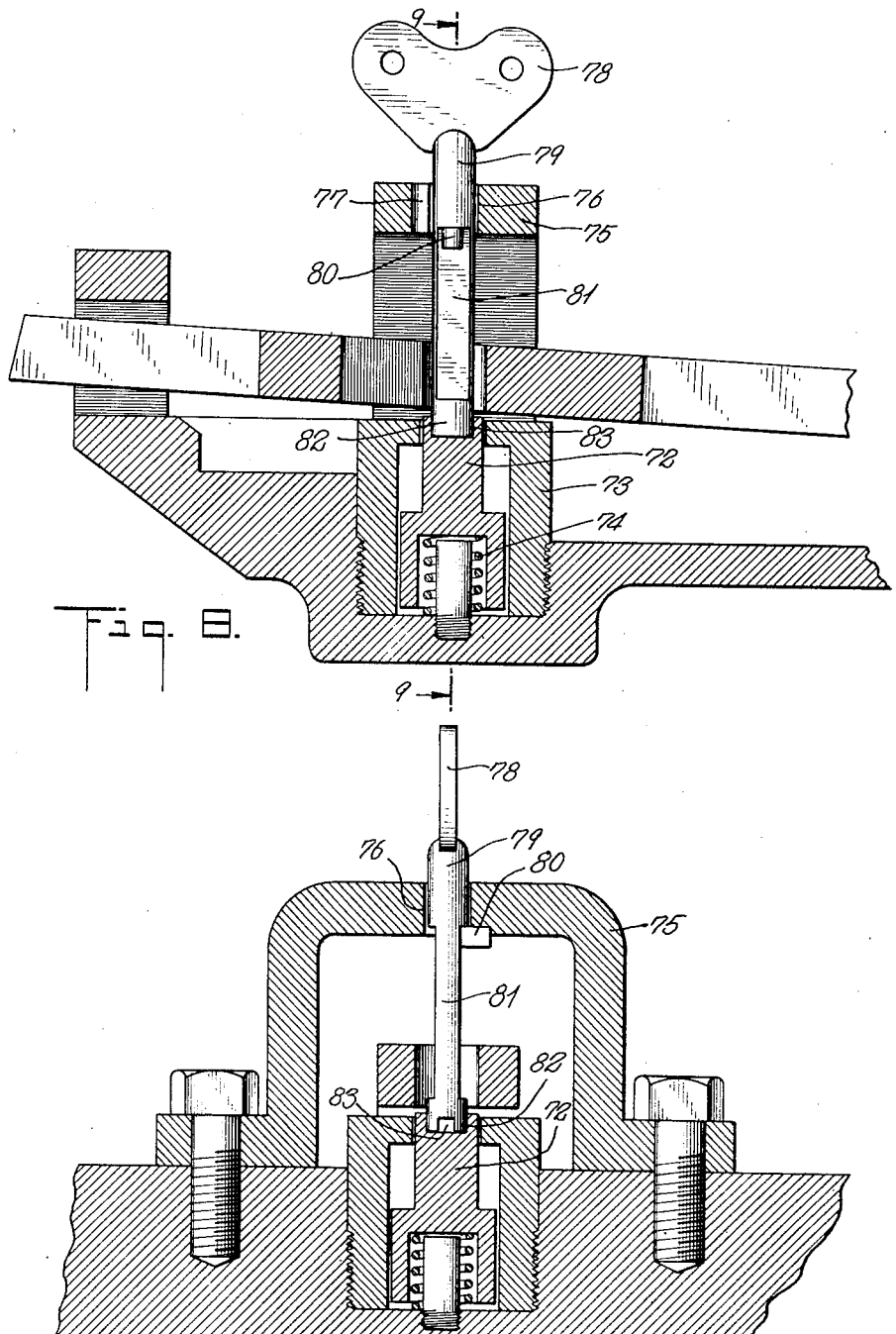

INVENTOR.
FRITZ G. CORNELL, JR.
BY
Kenyon & Kenyon
ATTORNEYS

July 11, 1950     F. G. CORNELL, JR     2,514,375
VARIABLE SPEED CHURN AND BUTTER WORKER
Filed Oct. 11, 1947     12 Sheets-Sheet 8

INVENTOR.
FRITZ G. CORNELL, JR.
BY
Kenyon & Kenyon
ATTORNEYS

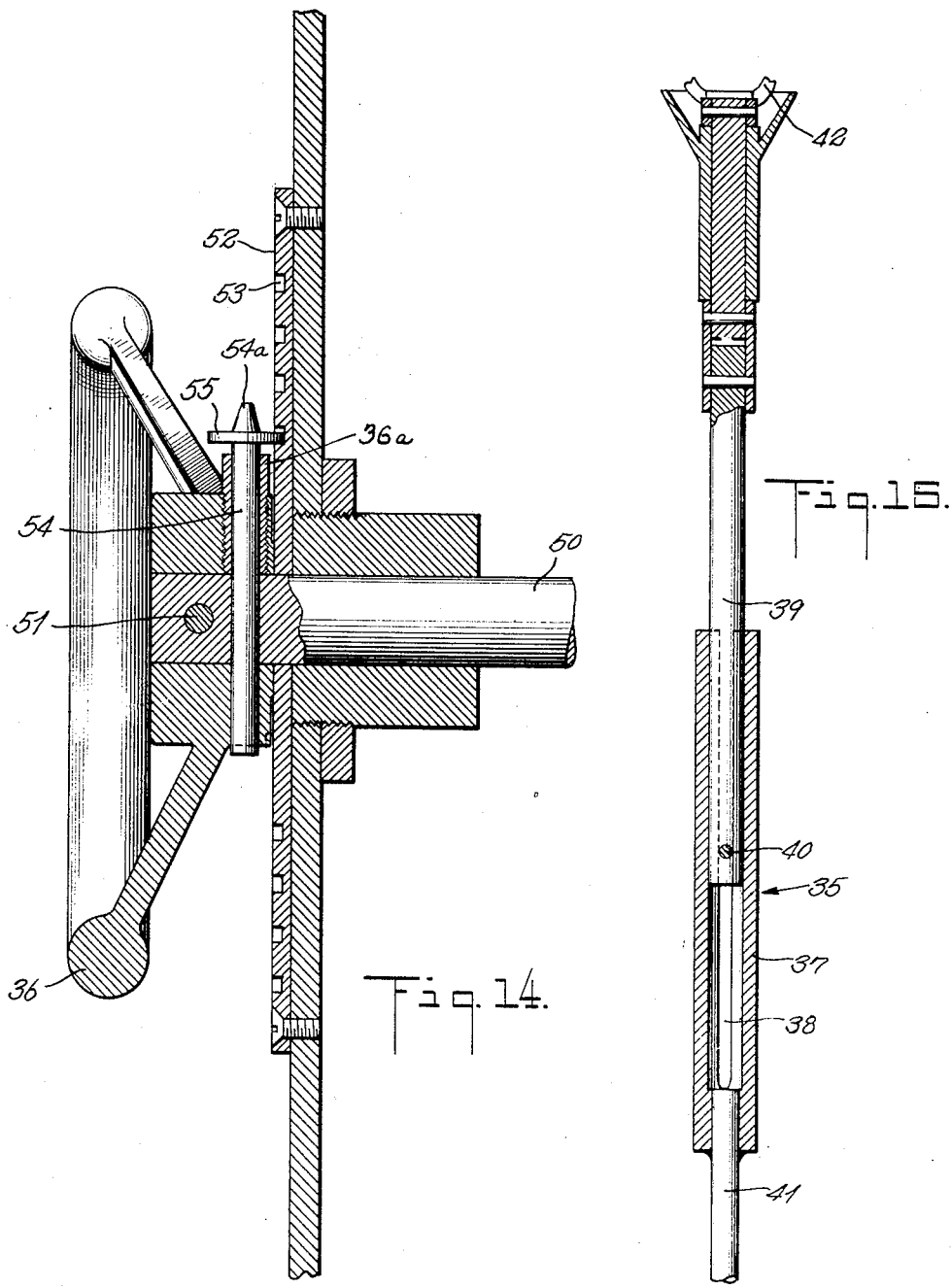

July 11, 1950 F. G. CORNELL, JR 2,514,375
VARIABLE SPEED CHURN AND BUTTER WORKER
Filed Oct. 11, 1947 12 Sheets-Sheet 10

INVENTOR.
FRITZ G. CORNELL, JR.
BY
Kenyon & Kenyon
ATTORNEYS

July 11, 1950   F. G. CORNELL, JR   2,514,375
VARIABLE SPEED CHURN AND BUTTER WORKER
Filed Oct. 11, 1947   12 Sheets-Sheet 11

INVENTOR.
FRITZ G. CORNELL, JR.
BY Kenyon & Kenyon
ATTORNEYS

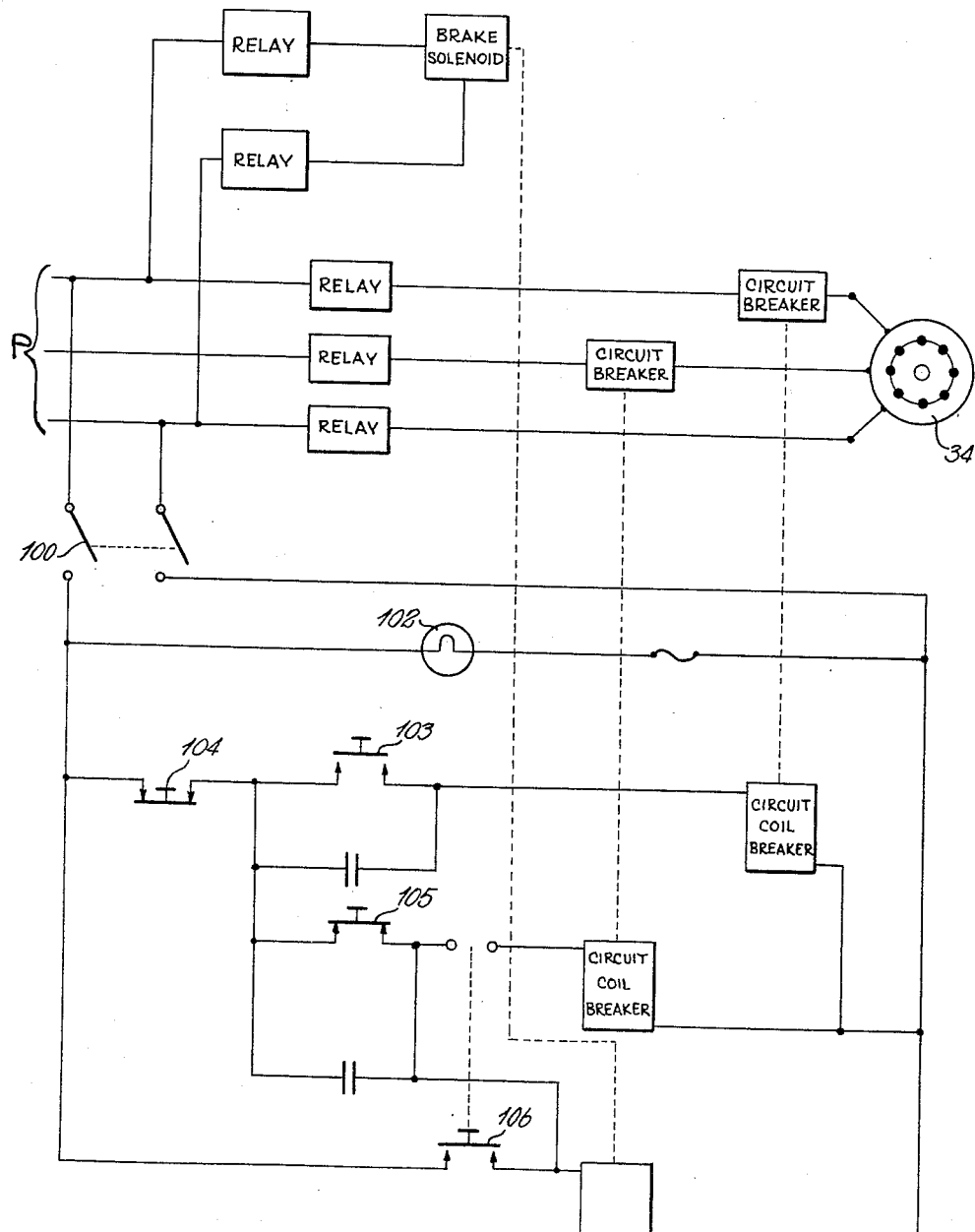

Patented July 11, 1950

2,514,375

UNITED STATES PATENT OFFICE 2,514,375

VARIABLE SPEED CHURN AND BUTTER WORKER

Fritz G. Cornell, Jr., Mountain Lakes, N. J., assignor, by mesne assignments, to General Dairy Equipment Inc., Minneapolis, Minn., a corporation Application October 11, 1947, Serial No. 779,246

9 Claims. (Cl. 259—81)

This invention relates to barrel type churns and butter workers and, more especially, to such devices in which the barrel is of general parallelepipedonal shape. More particularly, it relates to churns of the type described in Cornell, Jr., Patent No. 2,267,898 provided with variable speed driving arrangements for increasing the utility of such churns. It may be applied to other types of churns.

A principal object of this invention is to provide a churn and butter worker having provision for subjecting the cream during the churning operation to maximum agglomerative action and later minimizing the sliding of the mass of butter along the barrel walls during the working operation by providing the barrel during churning with an optimum number of variable speeds and by providing the barrel during working operation with an optimum number of variable speeds.

It is found that butter fat will react in general as follows:

A. Cream at too low a temperature for favorable agglomeration of the fat particles in types of churn previous to this one may be more successfully handled when the operator has recourse to the variable speeds available with the new arrangement herein described.

B. In the case of cream containing lower percentages of butter fat where the globules are more widely separated, an increased amount of agitation attainable with the new churn through its variable speeds causes a more rapid agglomeration or coherence or gathering of butter fat particles into larger flakes or masses preparatory to working.

1. Unripened cream because of its natural viscosity retards cohesion or agglomeration of fat globules which can be counteracted by the increased concussive force available with the variable speeds made available herein.

2. Ripened cream having lessened viscosity will churn more satisfactorily at lower speeds than unripened cream. Cream is ripened over such a great variety of time periods that a single set speed of the barrel heretofore available for churning often fails to furnish the optimum speed for the type of fat handled.

C. Cream at higher churning temperatures requires various speeds of the barrel to produce efficient over-all churning results.

D. Soft fats cohere or agglomerate more quickly but less completely than hard fats thus justifying the variable speeds as required by the particular fat being used at the time.

E. High test cream in which the fat globules are in close proximity will agglomerate or cohere or break too quickly, resulting in excessive fat loss in the buttermilk when the rotational speed causing agitation cannot be adjusted to the point necessary for optimum recovery of the fat.

F. Further, unless speed variation is available, small churnings suffer from excessive concussion caused by too high barrel speed resulting in too rapid agglomeration of the fat globules causing high fat loss.

In the past, some churns have been provided with only one speed for both churning and working while others have been provided with two different speeds, the higher of which was used for churning and the lower of which was used for working. No churns heretofore have been provided with means for permitting the operator to vary the speed of the barrel during the churning operation and/or for permitting the operator to vary the speed of the barrel during the working operation.

Another object of this invention is a provision of a churn and butter worker composed of a metal to which the butter does not adhere and means for operating the said churn and butter worker at variable speeds which will satisfy the foregoing factors to produce desirable quality butter.

Another object of the invention is to provide manually controlled means for effecting optimum variable speeds.

Still another object of the invention is to provide an electrically driven mechanism capable of being operated by a series of push-button controls located on a panel that will facilitate starting, stopping, braking and inching forward of the churn barrel and, also, permit variation of the speed of the latter.

Yet another object of the invention is to provide a churn barrel capable of being driven at variable speeds which will permit the barrel to churn successfully larger quantities of cream than practical with previous types of churns which for best results can only be filled to about one-half capacity.

Still another object of the invention is to provide a locking arrangement for the barrel door which will require locking of the door by a key and thereafter the transference of the said key to a key operated switch which controls the electrical power supplied for rotating the barrel.

Other objects, novel features and advantages of this invention will become apparent from the following specification and accompanying drawings wherein:

Fig. 4 is an enlarged elevational view partially in section of a lock equipped door for the churn barrel taken along line 4—4 of Fig. 1 and viewed in the direction of the arrows;

Fig. 5 is an enlarged section taken along line 5—5 of Fig. 1 and viewed in the direction of the arrows;

Fig. 8 is a similar view illustrating positions of parts when the operating key has been inserted into the locking mechanism and rotated to locking position;

Fig. 9 is a section taken along line 9—9 of Fig. 8 and viewed in the direction of the arrows;

Fig. 14 is a section taken along line 18—18 of Fig. 13 and viewed in the direction of the arrows;

Fig. 15 is a longitudinal sectional view on an enlarged scale of the connecting coupling between the manual control and other parts of the speed varying mechanism;

Fig. 19 is a schematic illustration of the electrical circuits employed.

Figure 1:
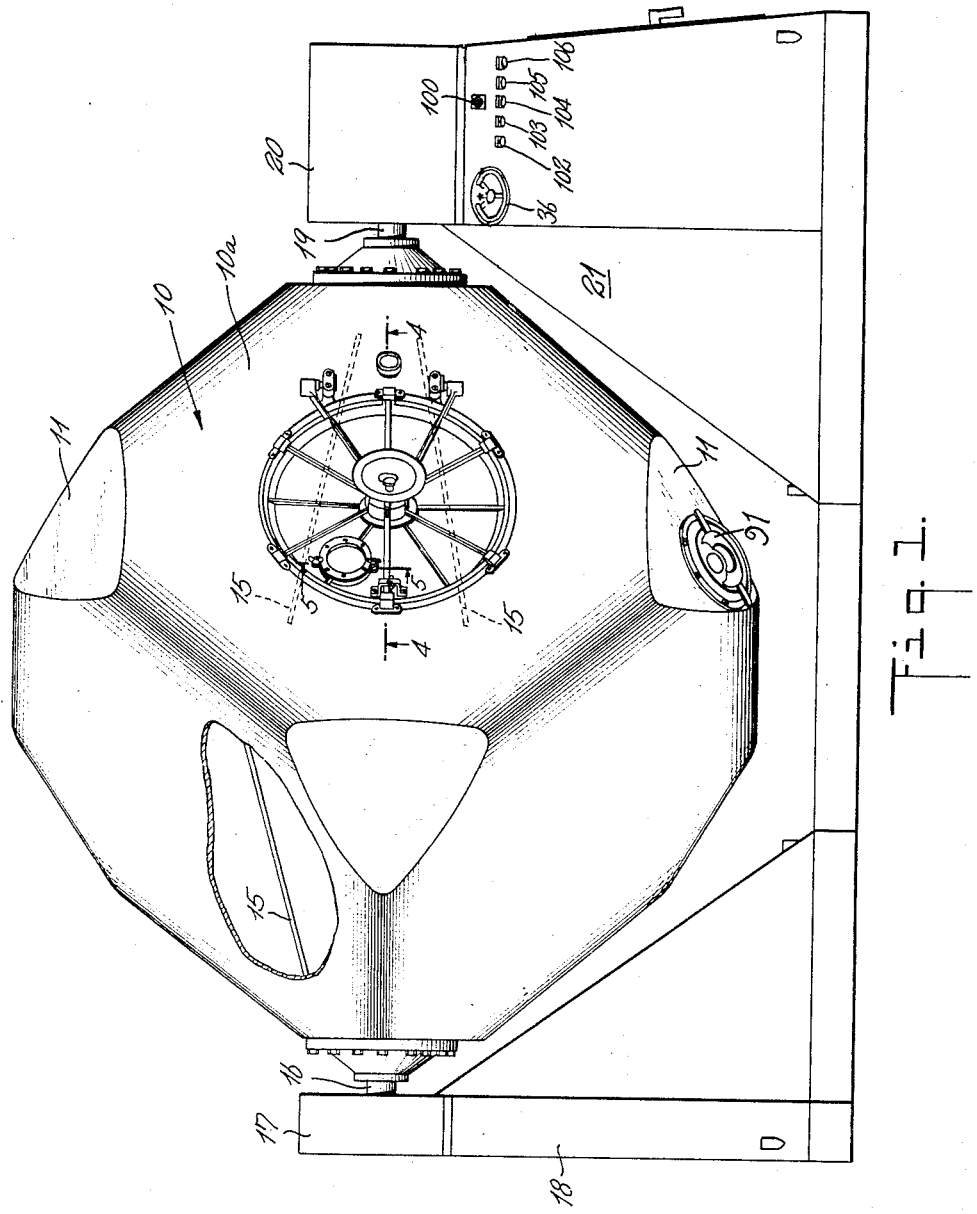
Fig. 1 is an elevational view, partially broken away, of a churn embodying the invention.

Referring to the drawing and first to Fig. 1, the barrel or churn receptacle 10 is of substantially cube shape with the corners flattened as indicated at 11. This receptacle 10 which is composed of a metal to the surface of which butter will not stick, for example, one of the metals described in the patents to C. L. Mitchell et al. Nos. 2,200,513 and 2,200,514 both dated May 14, 1940, is rotatably supported at two opposite corners for rotation about a diagonal as an axis. The barrel 10 may be constructed as described in Cornell, Jr., Patent No. 2,267,898. As the barrel 10 is rotated, first a corner to one side of a diagonal axis perpendicular to the first-named diagonal axis and then a corner on the opposite side of the said second diagonal axis assumes its lowermost position with the result that the contents of the barrel move from one side to the other of said diagonal second-named axis, thus subjecting the barrel contents to violent lateral agitation in addition to the normal rotating agitation.

As described in the aforementioned Cornell patent, each inner face of the cubical barrel 10 is provided with two or more rectilinear ribs 15 extending fanwise from the supported corners and reaching nearly to the aforementioned diagonal axis. Each of these ribs 15 lies in the same plane with the axis of rotation and the end of each rib is slightly cut back so that it does not interfere with the free flow of liquid to the lowermost part of the barrel 10.

Figure 2:
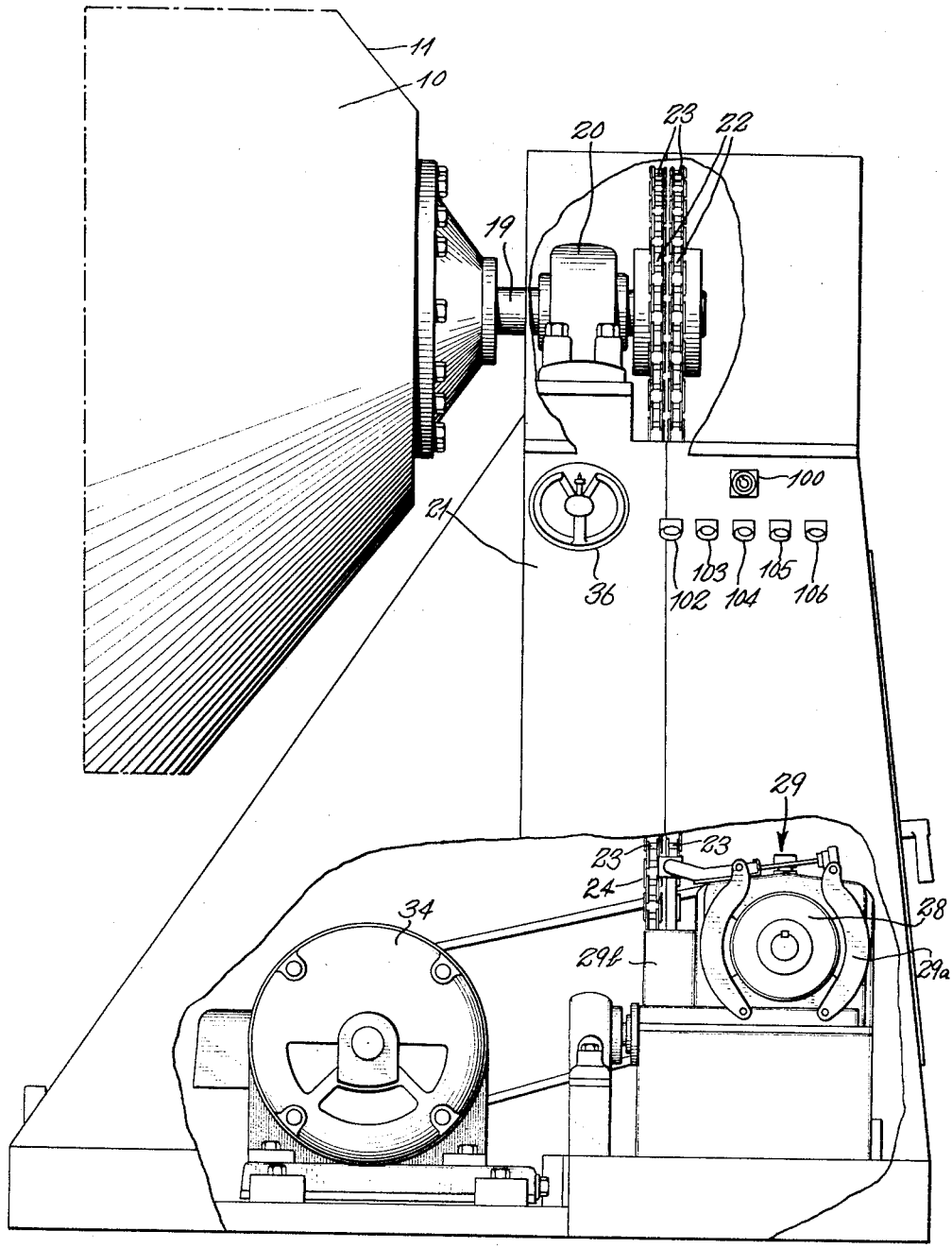
Fig. 2 is a fragmentary elevational view partially broken away of one end of the churn showing details of the drive and speed control mechanisms in one of the supporting pedestals.
Figure 3:
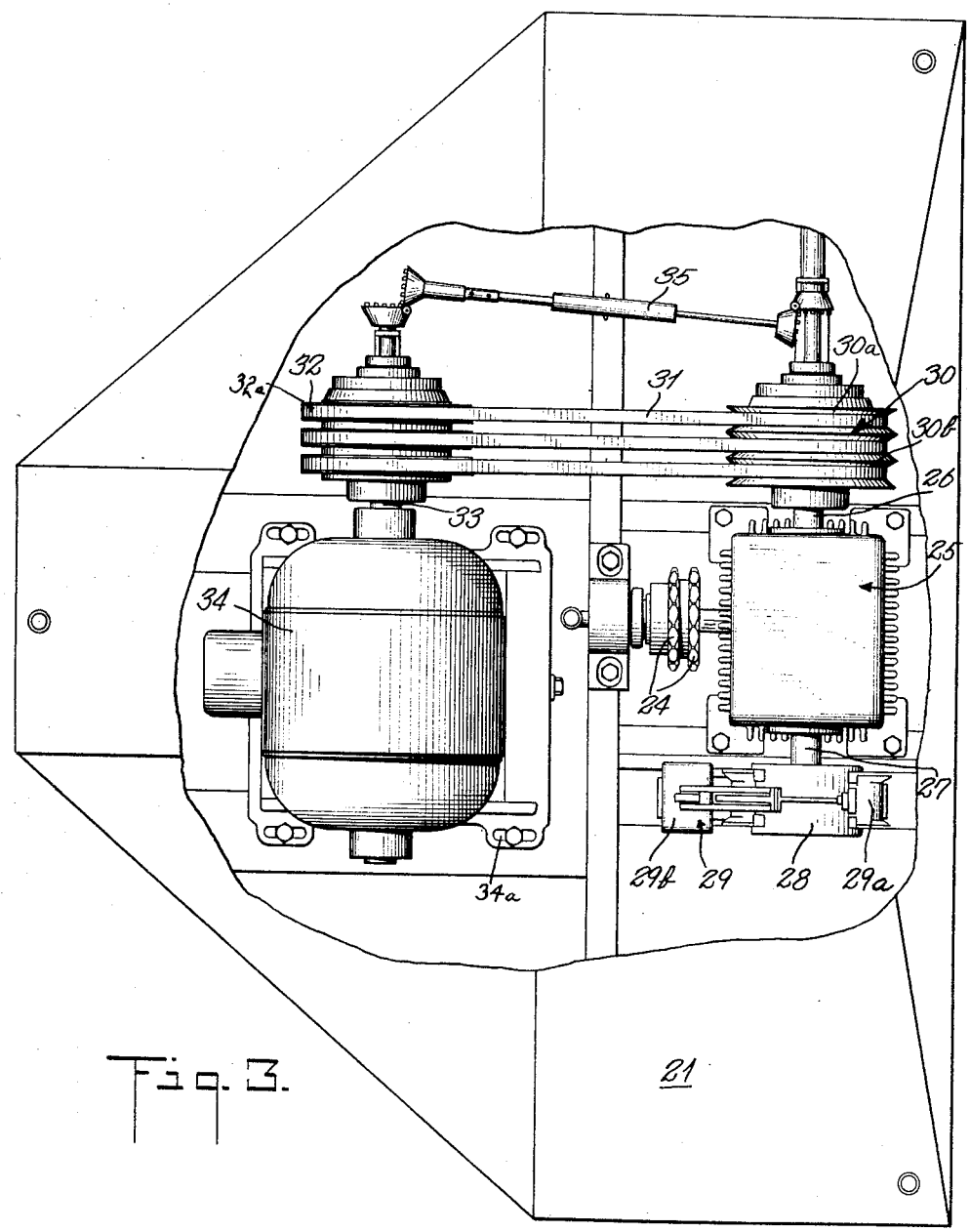
Fig. 3 is an enlarged plan view of a portion of the speed control mechanisms.
Figure 6:
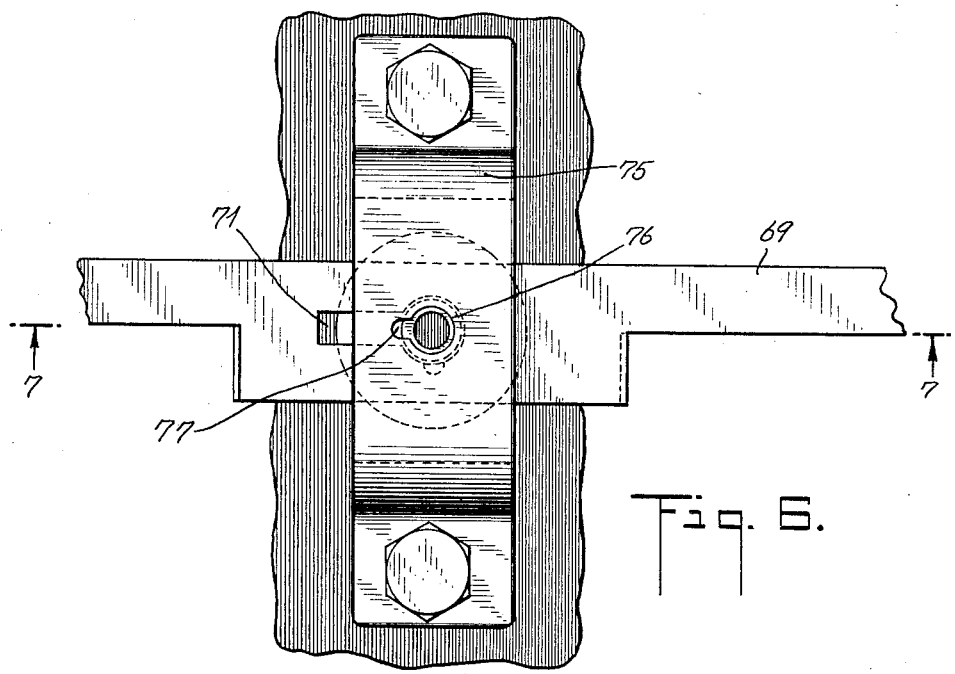
Fig. 6 is an enlarged plan view of the key-controlled door locking mechanism.
Figure 7:
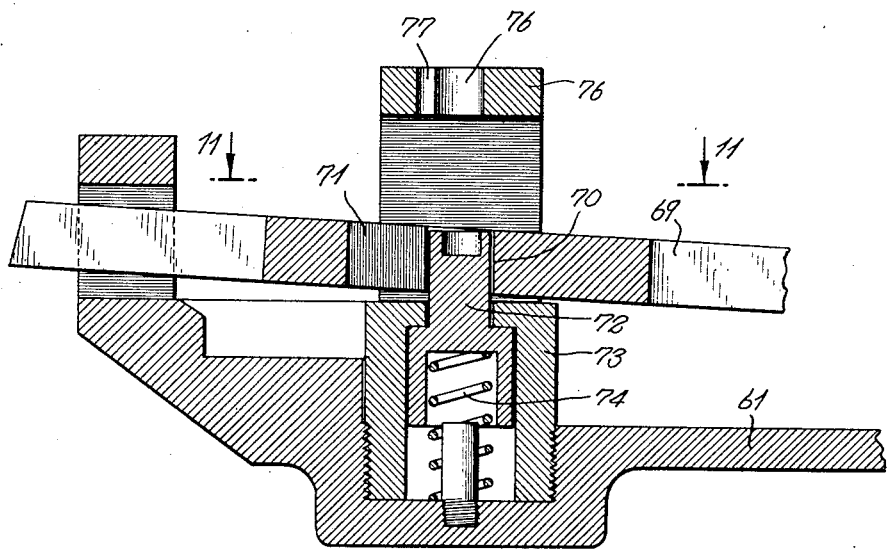
Fig. 7 is a section taken along line 7—7 of Fig. 6 and viewed in the direction of the arrows.
Figure 10:
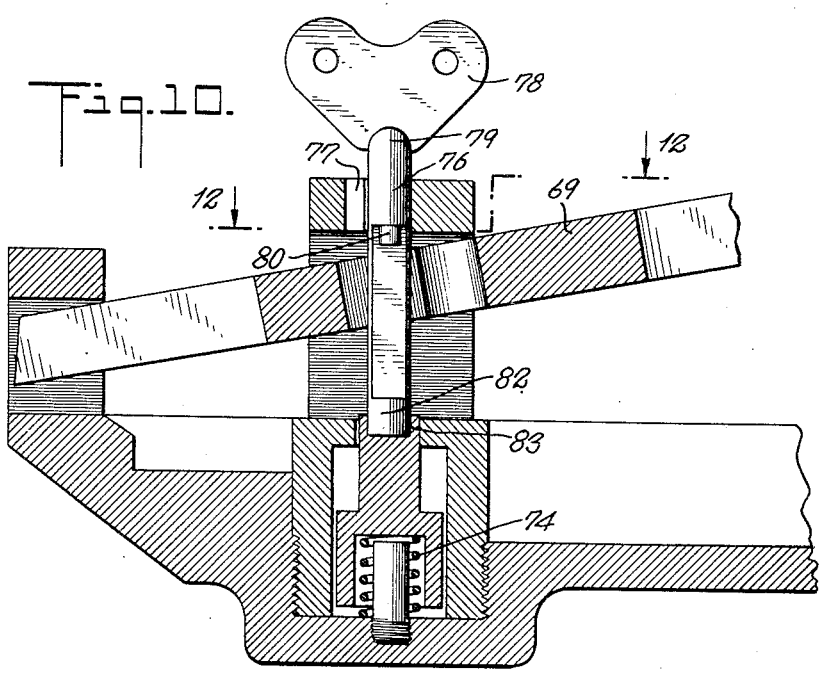
Fig. 10 is a section similar to Fig. 8 showing the position of parts when the latch or bolt has been moved to unlocking position.
Figure 11:
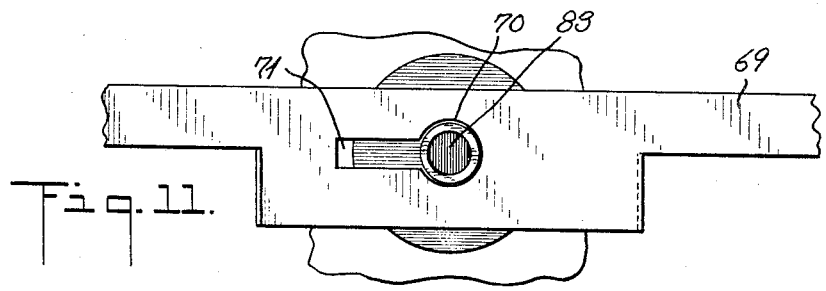
Fig. 11 is a fragmentary plan view taken along line 11—11 of Fig. 7 and viewed in the direction of the arrows.

One of the supported corners of the barrel 10 is provided with a stub shaft 16 which is rotatably supported in the self-aligning bearing 17 carried on a pedestal 18. The opposite supported corner of the barrel 10 is provided with a stub shaft 19 which is rotatably supported in a self-aligning bearing 20 supported on a pedestal 21. Sprocket wheels 22 are splined to the shaft 19. These sprocket wheels 22 are connected (Figs. 2 and 3) by sprocket chains 23 to sprocket wheels 24 fixed to an output shaft of a speed reducing device 25. This speed reducing device is of conventional type and is provided with an input shaft 26 and a brake drum bearing shaft 27. A brake drum 28 is splined to the shaft 27. An electromagnetically operated friction brake 29 having shoes 29a which are designed to operate on the drum 28 is provided. The shoes 29a normally are in braking position and are released by supplying electrical current to the coil 29b of the brake. Sheaves 30 of the separable face type (Fig. 3) are mounted upon the input shaft 26 of the speed reducer 25. The movable faces 30a of the sheaves 30 are mounted slidably on the shaft 26 and tapered oppositely to the fixed faces 30b thereof and to provide tapered grooves about the peripheries of the sheaves 30 of variable width. Tapered driving belts 31 are mounted on the sheaves 30 between the tapered fixed and movable faces thereof and around corresponding type sheaves 32 mounted on the drive shaft 33 of an electrically operated motor 34. The movable faces 32a and 30a, respectively, of the sheaves 32 and of the sheaves 30 are connected by a coupling member 35 presently to be described so that the latter may be operated to cause movement of respective movable faces 30a and 32a of the sheaves 30 and 32 in opposite directions to effect groove variation and consequent variation in speed of the input shaft 26 of the speed reducer 25 from the motor drive shaft 33 in well known manner through the driving belts 31.

Figure 13:
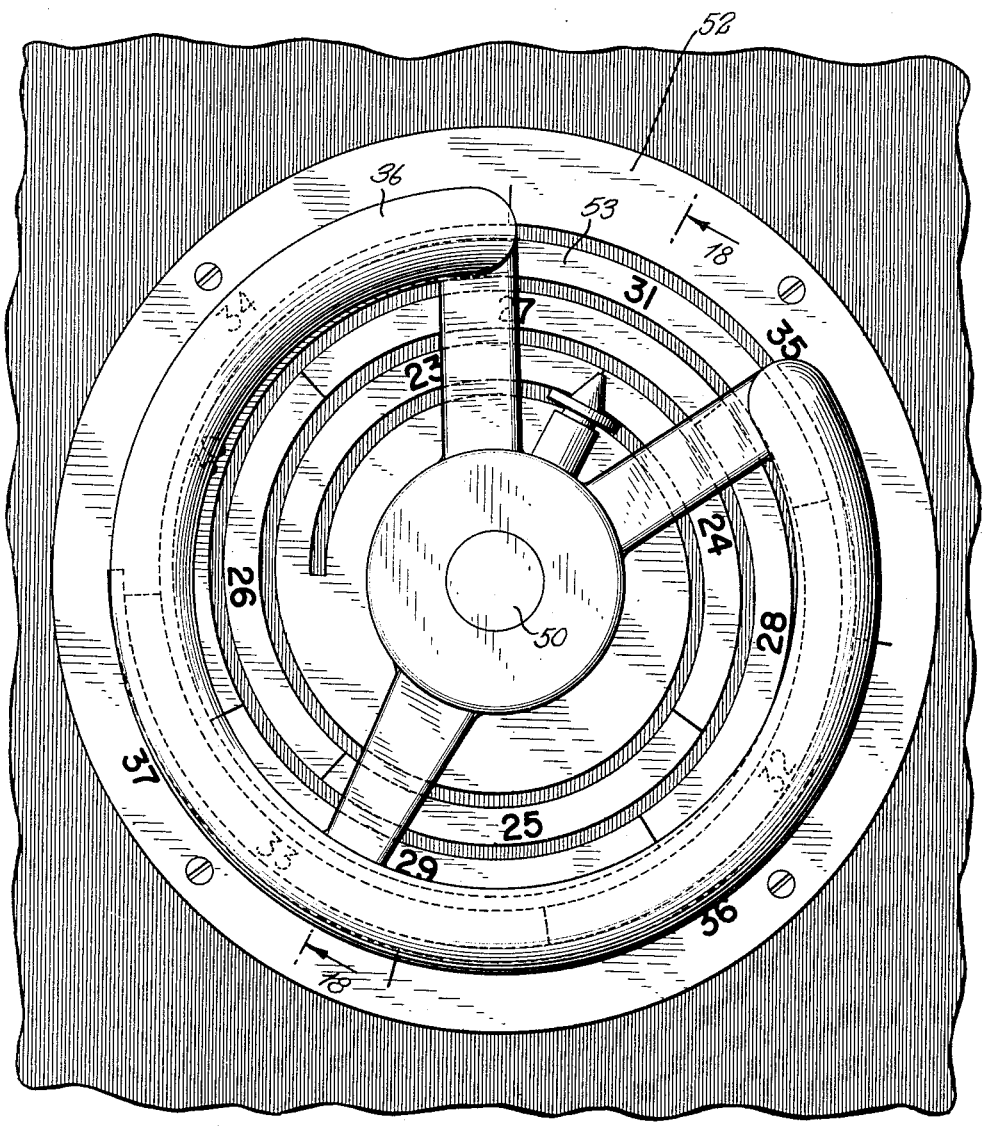
Fig. 13 is an enlarged plan view of the manual control for the variable speed mechanism.
Figure 16:
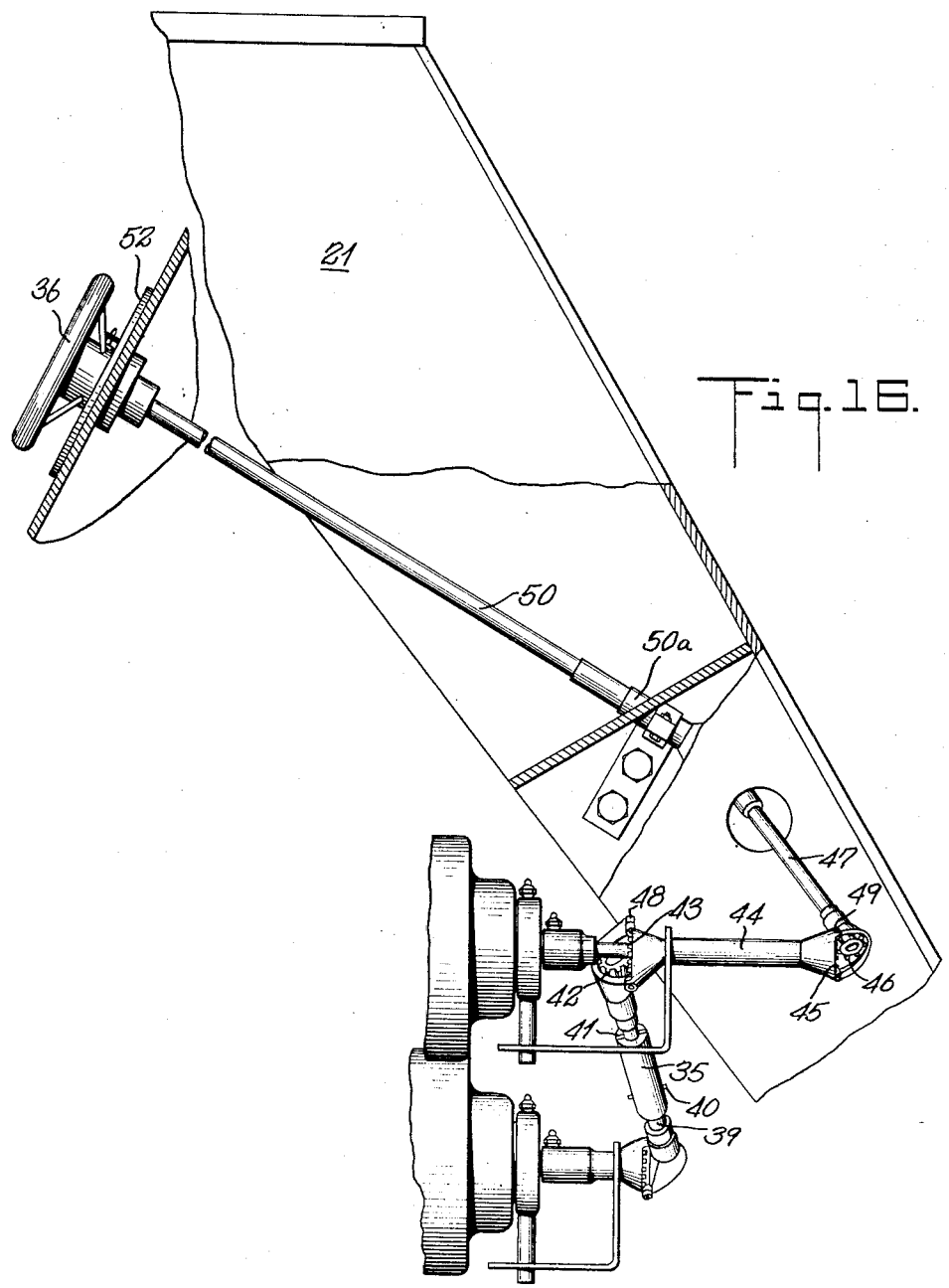
Fig. 16 is a schematic elevational view illustrating the coupling between the manual control and the speed varying mechanism.

The coupling member 35, as best seen in Fig. 15, is operated by a manual control wheel 36 (Figs 13 and 14) which is externally accessible at a control position or dial panel on the pedestal 21. As seen in Fig. 15, the coupling member 35 includes a tubular sleeve 37 that is slotted longitudinally at 38. A rod 39 is movable telescopically within the sleeve 37 and is provided with a laterally extending pin 40 that is movable in the slot 38. A rod-like member 41 extends axially outwardly of the sleeve 37 in the opposite direction to the rod 39. The outer ends of the rods 39 and 41 are provided with beveled spur gears 42. The spur gear 42 at the outer end of the rod 41 is adapted to mesh with spur gear 43 (Fig. 16) carried on a rotatable link 44. A second spur gear 45 is carried at the opposite end of the link 44 and meshes with a spur gear 46 carried on the end of a rotatable link 47. The link 44 is pivotally connected at 48 and 49, respectively, with the rod 41 and the link 47. The opposite end of the link 47 is coupled by gears (not shown) to a drive rod or shaft 50 which is suitably supported rotatably at 50a within the pedestal 21. The manual control wheel 36 is splined to the shaft 50 at 51 (Fig. 14). The telescopic fit of rod 39 in sleeve 37 permits adjustment of the motor 34 on its supports 34a (Fig. 3) to compensate for belt stretch.

A substantially circular plate 52 (Figs. 13 and 14) is suitably mounted on the outer face of the pedestal about the shaft 50. This plate 52 is provided with a helical groove 53. A diametrically extending pin 54 is slidably borne in a diametrically extending opening provided in the shaft 50 and a sleeve 36a of the manual control wheel 36. A circular cam follower disc 55 is secured to the slidable pin 54. This disc 55 engages the helical groove 53 so that when the control wheel 36 is rotated, it follows the helical groove 53 and causes longitudinal movement of the rod 54 which may be pointed at its end 54a so that the latter functions as a speed indicator. Speed indicator markings are provided on the face of plate 52. The rotation of the manual control wheel 36 causes rotation of the shaft 50 and through the coupling links 47 and 44 effects corresponding rotation of the coupling member 35 with corresponding opposite longitudinal movement of the movable faces 30a and 32a of the sheaves 30 and 32 to effect corresponding changes in groove width and hence of speed imparted by the drive shaft 33 of the motor 34 to the input shaft 26 of the speed reducing device 25. Corresponding variations in speed are transmitted through the speed reducer 25 to the sprocket wheels 24 and from thence via sprocket chains 23 to the sprockets 22 which serve in turn to drive the drive shaft 19 of the churn barrel 10. Since the sheaves 30 and 32 are of the V type, infinite variation in speed within practical limits is possible by manipulation of the hand control wheel 36. In practice, the minimum and maximum speed limits will range between variations that have been found sufficient for all practical churning purposes. Other types of speed variation may be used.

One of the faces 10a of the barrel 10 is provided with an opening 60 (Figs. 4 and 5). A door 61 supported on hinges 62 is adapted to close the opening 60. The door 61 has a peephole 63 (Fig. 5) which is covered by a removable transparent window 63a. The window 63a is carried in a suitable frame 64 and is detachable from over the opening 63 by loosening of thumb screws 65 or the like.

The door 61 is provided with key-controlled locking means to maintain it in closed position. In the embodiment shown (Figs. 4 etc.), the locking means include a latch or bolt engaging member 68 secured fixedly to the face 10a adjacent the door opening 60. A key-controlled latch member or bolt 69 is movable slidably into and out of engagement with the member 68. The latch member or bolt 69 has a substantially circular hole or opening 70 to which is joined to a longitudinally extending slot 71. A spring-actuated locking pin 72 is supported in a sleeve 73 mounted on the face of the door 61 and in alignment with the opening 70 in the bolt 69 when the latter is in locking engagement with the latch engaging member 68. This pin 72 is urged upwardly into such position by a compression spring 74. While the locking pin 72 engages in the opening 70, the bolt 69 is prevented from displacement relative to the latch engager 68. This is the position when the door is locked in closed position.

In order to unlock the door, it is necessary to displace the locking member 72 so as to clear the opening 70. A yoke 75 provided with a keyhole 76 is mounted over the locking member 72 above the opening 70. This keyhole 76 is in axial alignment with the axis of locking member 72. The keyhole 76 has a radially extending slot 77.

Figure 12:
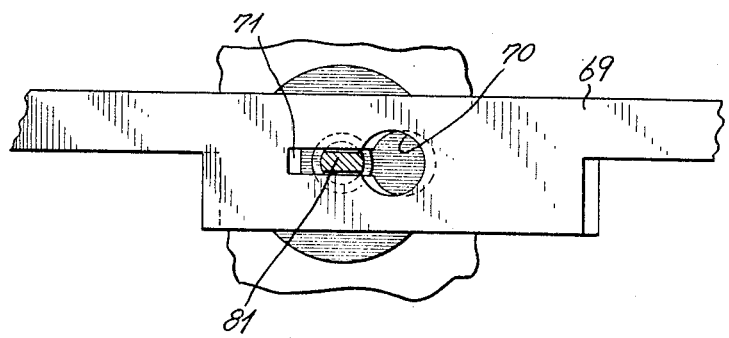
Fig. 12 is a similar fragmentary sectional view taken along line 12—12 of Fig. 10 and viewed in the direction of the arrows.

A key 78 (Fig. 8) having an elongated cylindrical body part 79 is adapted to be inserted into the keyhole 76. A prong 80 extending laterally from the body 79 must register with the slot 77 to permit such insertion. The body part 79 has a flattened portion 81 (Figs. 8 and 12) admeasured to fit slidably in the slot 71. The body 79 is of such length that when the key 78 is inserted into the keyhole 76, its lowermost end 82 will engage the recess 83 in the locking member 72. When such an engagement occurs and the key is pushed into the keyhole 76, the locking member 72 is moved out of the hole 70 in opposition to the compression spring 74. When this occurs, the key is rotated to bring the flattened portion 81 into alignment of the slot 71. The abutment 80 then engages the underface of the yoke 75 to prevent ejection of the key 78. The bolt or latch member 69 may be withdrawn from its engagement with the latch engaging member 68 to permit the door to be opened. It will be noted that the key 78 because of the engagement of the abutment 80 with the underface yoke 75 cannot be withdrawn as long as the latch or bolt 69 does not engage the member 68. Likewise, the key 78 cannot be rotated to withdrawing position as long as the flattened portion 81 engages in the slot 71. The flattened portion 81 will only clear the slot 71 when the bolt or latch member 69 is in its locking position. Since the key 78 is required to unlock a key-controlled electrical switch used to connect power to the driving motor 34, accidental power operation of the churn when the door 61 is opened cannot take place. The key 78 can only be removed after the latching member or bolt 69 has been slid into engagement with the latch engager 68. Then the abutment 80 is rotated for registry with the slot 77. When the latter event occurs and the key 78 is withdrawn, the compression spring 74 moves the locking member 72 into engagement in the hole 70 of the locking member 69 and prevents accidental motion of the latch or bolt 69 to an open position. The key 78 can then be withdrawn from the lock 75 for insertion into the keyhole of a key-operated electrical switch presently to be described.

Figure 17:
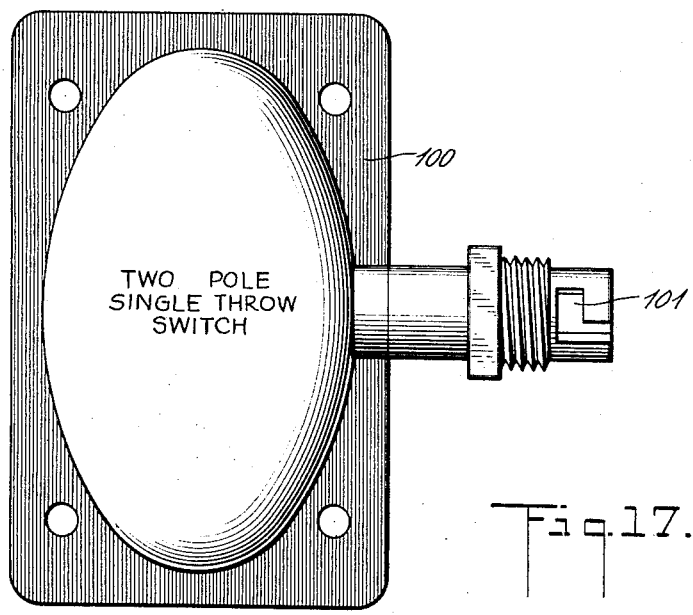
Fig. 17 is a plan view of the key-controlled electrical switch for the system.
Figure 18:
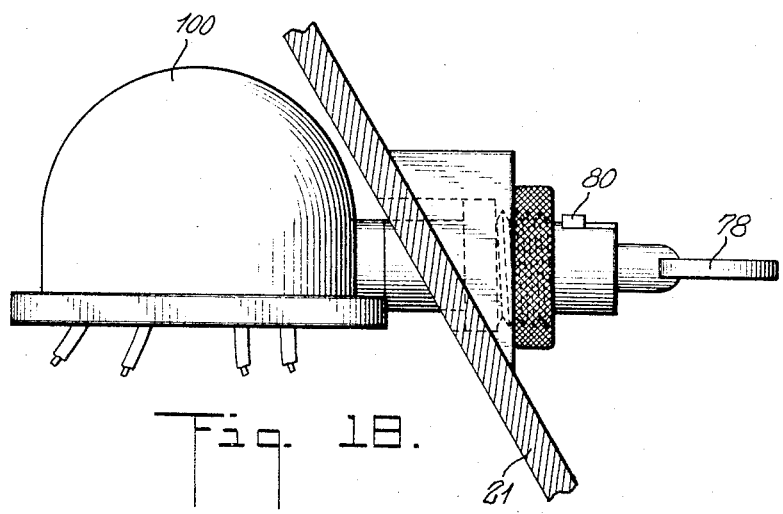
Fig. 18 is a side elevational view partially in section of this same switch mechanism.

The electrical circuit embodied in the invention includes a key-operated "on" and "off" switch 100 for supplying power from a power source P, the usual types of relays and protective devices shown diagrammatically in Fig. 19, a power "on" signal light 102, a button operated starting switch 103, a button operated stopping switch 104, a button operated inching switch 105 and a button operated brake disconnecting switch 106. These switches are electrically connected with the source of power and in electric circuits and with the electrical motor and with the magnetic operating coil 29b of the brake 29 so that the following sequence of operations may occur. After the churn barrel 10 has been loaded through the open door 61 with the cream from which the butter is to be made, the door 61 is closed and the locking bolt 69 moved into locking engagement with the latch engaging member 68. The key 78 is then rotated to withdrawing position and removed from the keyhole 72. This key 78 is then inserted into the keyhole of the key-operated switch 100 which is of conventional type and is rotated to the power "on" position. At such time, the abutment 80 of the key engages in the bayonet slot 101 (Fig. 17) of the switch 100 so that it cannot be withdrawn while power is on. Inasmuch as the key 78 is required to open the door 61, there is little likelihood that the operator will attempt to perform any operations on the door of the churn as long as power is on, because of his knowledge of the fact that the key 78 is required to open the door 61.

When the key 78 is in the "on" position in the switch 100, the operator closes the starting switch 103 (Fig. 19). As soon as the button of the starting switch 103 is depressed, electric current flows from the main source of supply P, the main key-operated switch 100, the power on light 102 and also through the now closed contacts of the starting switch 103 to supply electric current directly to the motor 34. At the same time, the closure of the starting switch 103 supplies electrical power to energize the solenoid or magnet coil 29b of the brake causing the brake shoes 29a to release the brake drum 28. Thus, when the the button of the starting switch 103 is depressed, the rotation of the drive shaft 33 of the motor 34 is transmitted through the sheaves 32, drive belts 31, sheaves 30, shaft 26, speed reducing device 25, sprockets 24, sproket chains 23 and sprockets 22 to the shaft 19 on the drum 10 causing the latter to rotate.

The operator may then adjust the speed of rotation of the drum 10 by manipulation of the manual control wheel 36 to position the pointer 54a thereof opposite the desired speed index number on the face of the helical groove containing plate 52. The manipulation of the hand wheel 36, through the shaft 50 and the links or the coupling members 47 and 44 and 35 causes required separation of movable faces of the sheave 32 and corresponding approach of the faces of the sheave 30 or vice versa, and automatic self-adjustment of the drive belts 31 on the sheaves to regulate the speed of rotation of the drum 10. Normally, the desirable speed for churning depends upon the characteristics of the cream being churned and varies to produce the optimum churning operation.

When churning has been completed, the button of the stop switch 104 is operated. This operation breaks the electric circuit to the motor and also to the solenoid coil 29b of the brake so that the motor stops and automatically the brake shoes 29a operate on the brake drum 28 to quickly or almost instantaneously stop rotation of the drum 10. If it is found, at such time, that the face of the drum bearing the door is not conveniently positioned for access by the operator, the button of the inching switch 105 is depressed momentarily by the operator. This operation temporarily, while the latter switch button is depressed, supplies electric current both to the motor and to the brake coil 29b and permits necessary rotation of the drum 10 to a position where the door 61 is conveniently accessible. If it is desired to operate or rotate the drum without the brake at all, the button of the brake switch 106 is depressed, connecting the power coil 29b of the brake for as long as desired, with consequent release of the brake drum 28 by shoes 29a.

The speed of rotation of the churn barrel 10 during working operations is controlled in the same manner by the operator as was the speed of the churning by the operations as hereinbefore described.

When working has been completed and the liquid contents drained from the churn barrel 10 and through the valve 91, the churned and worked butter is ready for removal from the churn barrel 10. To effect this, it is necessary for the operator to remove the key 78 from the key-operating switch 100 and to insert it into the keyhole 76 of the door lock 75 and then move the key 78 to the unlocking position hereinbefore described and shown in Fig. 8. The latching member or bolt 69 may then be withdrawn from the latch engaging member 68, to permit opening of the door 61 and the removal of the churned and worked butter from the barrel 10.

The apparatus hereinabove described permits the churning and working of cream of variable character into butter. It permits the churn speed either during churning or during working to be adjusted to a desirable speed within chosen limits to secure optimum churning and working conditions with the particular cream being churned and worked. It permits infinite variation and speed of the churn within these chosen limits. It permits churning to be effected at a higher rate of speed than is otherwise possible and, therefore, permits the larger quantities of cream to be churned at a time than heretofore possible with fixed speed churns. The controls for operation of the device are all conveniently situated at a single control position or panel for convenient access by the operator. Accidental operation of the churn while its access door is open is prevented and accidental electrical connection of the drive motor during the open condition of the churn door is prevented as the same key necessary to lock the churn door in closed position is required to unlock an electrical circuit to place the same in operating condition.

While a specific embodiment of the invention has been disclosed, it is to be understood that variations in structural details are possible and are contemplated. There is no intention, therefore, of limitation to the exact details shown and described.

What is claimed is:

1. A churn and butter worker comprising a closed rotatable churn barrel having substantially parallelepipedonal shape, supporting means for said barrel at opposite corners to permit rotation about a diagonal as an axis, a door for closing an opening to said barrel, a driving motor for rotating said barrel and infinite speed varying means for varying the speed of rotation of said barrel.

2. A churn and butter worker comprising a closed parellelepipedonal receptacle, supporting means for said receptacle at opposite corners for rotation about a diagonal as an axis, a driving motor, a speed reducer connected to said driving motor, and driving means connecting said speed reducer to said receptacle for rotating the latter and infinite speed varying means interposed between said driving motor and said speed reducer for varying the speed imparted to said receptacle.

3. A churn and butter worker comprising a rotatable receptacle having an opening therein, an electric driving motor for rotating said receptacle, a closure for said opening, key-operated locking means for said closure, an electrical circuit, a key-operated electrical switch in said circuit for connecting electrical power to said driving motor, a common key operable both for locking said closure and for operating said key-operated switch, and means to prevent removal of said key from said locking means while said closure is unlocked.

4. A churn and butter worker comprising a closed rotatable churn barrel, means for supporting said barrel for rotation, electrically operated driving means for rotating said barrel, speed varying means for varying the speed of rotation of said barrel, a key operated switch for connecting said driving means to a source of electric power, said churn barrel having a filling and emptying opening, a door for said opening, locking means for said door, and a key for operating said locking means, said same key being required for operation of said key-operated switch to prevent power operation of said barrel while said door is unlocked.

5. A churn and butter worker comprising a rotatable barrel, shafts extending from said barrel, supports for said shafts, a driving motor, a speed reducer, belt-connected sheaves with movable faces coupling said speed reducer to said motor, power transmitting means connecting said speed reducer with one of said shafts for rotating said barrel, a manual control member, and coupling means between said manual control member and said movable sheave faces to provide infinitely variable speeds within desirable limits for rotation of said barrel, said coupling means including a self-adjusting telescoping member to compensate for belt stretch between the belt-connected sheaves.

6. A churn and butter worker comprising a rotatable churn barrel, supports, shafts extending from said barrel and rotatably mounted in said supports, a driving motor, sheaves with movable faces driven by said motor, a speed reducer, sheaves with movable faces connected to said speed reducer, tapered belt connections between the first and second mentioned sheaves, power transmitting means connecting the said speed reducer to one of said shafts for rotating said barrel with power derived from said motor, manual control means, and coupling means between said manual control means and said movable faces of the sheaves for varying the positions of said movable faces and thereby providing infinite speed variation within desirable limits of the rotative power transmitted to said barrel by said power transmitting means.

7. A churn and butter worker comprising a rotatable barrel, supports, axially alined shafts fixed to and extending from opposite faces of said barrel and rotatably mounted in said supports, a driving motor having an output shaft, sheaves with movable and fixed faces carried on said output shaft, a speed reducer having an input shaft and an output shaft, sheaves with movable and fixed faces carried on the input shaft of said speed reducer, belt connection between the first and second-named sheaves, power transmitting means connecting the output shaft of said speed reducer and one of said first-named shafts for rotating said barrel with power derived from said motor via said sheaves and speed reducer, a manual control member and coupling means between the said manual control means and the movable faces of the sheaves for varying their positions relative to their fixed faces, thereby providing for infinitely variable speed of rotation of said barrel within desirable limits during both churning and butter working.

8. A churn and butter worker comprising a rotatable closed churn barrel having an opening, a door for said opening, a latch on said door, a latch engaging member on said barrel, locking means for preventing disengagement of said latch and said latch engaging member, a key for operating said locking member to an unlocking position to permit disengagement of said latch and said latch engaging member and the unlocking of said door, electrically driven means for rotating said churn barrel, a key operated switch for connecting electrical power to said electrically driven means, said same key being required to operate said switch and said locking means, means to prevent removal of said key from said locking means in the unlocked position of the latter and while the latch and latching member are disengaged to preclude use of said key in said key-operated switch at such time, thereby preventing power operation of said barrel while the door is unlocked.

9. A churn and butter worker comprising a rotatable barrel, a door for said barrel, a latch on said door, a latch engaging member on said barrel with which said latch is engageable to lock the door in closed position, a spring-biased locking member for locking said latch in its engaged position with said latch engaging member, said latch having an opening, a key insertable through said opening for moving said locking member to an unlocked position to permit disengagement of said latch with said latch engaging member and the unlocking of said door, a part on said key engageable with said latch to prevent removal of said key from said opening while said door is unlocked, electrically driven means for rotating said barrel, and a key-operated switch for connecting said electrically driven means to a source of electric power, said same key being required to operate said switch, thereby preventing electrically driven rotation of said barrel while said door is unlocked.

FRITZ G. CORNELL, Jr.

REFERENCES CITED

The following references are of record in the file of this patent:

UNITED STATES PATENTS

| Number | Name | Date |
|---|---|---|
| 446,263 | McBride | Feb. 10, 1891 |
| 565,720 | Brown | Aug. 11, 1896 |
| 1,837,244 | Watson | Dec. 22, 1931 |
| 2,060,997 | Lockett | Nov. 17, 1936 |
| 2,137,534 | Lockett | Nov. 22, 1938 |
| 2,267,898 | Cornell | Dec. 30, 1941 |
| 2,385,671 | Whiting | Sept. 25, 1945 |